United States Patent
Groom et al.

(10) Patent No.: US 9,272,588 B1
(45) Date of Patent: Mar. 1, 2016

(54) METHOD AND APPARATUS FOR REPLACING A TIRE VALVE STEM WITHOUT HAVING TO RAISE THE VEHICLE, REMOVE THE WHEEL, OR TIRE FROM THE WHEEL

(71) Applicants: John R. Groom, Brooksville, FL (US); John McGahee, Brooksville, FL (US)

(72) Inventors: John R. Groom, Brooksville, FL (US); John McGahee, Brooksville, FL (US)

( * ) Notice: Subject to any disclaimer, the term of this patent is extended or adjusted under 35 U.S.C. 154(b) by 56 days.

(21) Appl. No.: 14/457,849

(22) Filed: Aug. 12, 2014

(51) Int. Cl.
*B60C 23/10* (2006.01)
*B60C 29/02* (2006.01)

(52) U.S. Cl.
CPC ...................... *B60C 29/02* (2013.01)

(58) Field of Classification Search
CPC ................. B60C 29/02; B60C 25/18
USPC .................................. 152/427, 429
See application file for complete search history.

(56) References Cited

U.S. PATENT DOCUMENTS

| | | | | | |
|---|---|---|---|---|---|
| 3,631,746 | A | * | 1/1972 | Rarog | B29C 73/08 81/15.7 |
| 3,750,258 | A | * | 8/1973 | Sampo | B60C 25/18 29/221.5 |
| 4,528,735 | A | * | 7/1985 | Eastridge | B60C 25/18 29/221.5 |
| 5,097,580 | A | * | 3/1992 | Story | B25B 27/026 29/221.5 |
| 6,574,843 | B1 | * | 6/2003 | Meadows | B25B 27/24 29/221.5 |
| 6,966,331 | B2 | * | 11/2005 | Simmons | B60C 29/02 137/223 |
| 8,287,260 | B2 | * | 10/2012 | Penkkimaki | B29C 33/10 425/28.1 |
| 2008/0216617 | A1 | * | 9/2008 | Goodine | B25B 27/0057 81/451 |
| 2009/0053354 | A1 | * | 2/2009 | Hajduch | B29C 33/10 425/546 |
| 2013/0333769 | A1 | * | 12/2013 | Zalzalah | B60C 25/18 137/315.41 |
| 2014/0014197 | A1 | * | 1/2014 | Renaker | B60C 25/18 137/231 |

* cited by examiner

*Primary Examiner* — Hau Phan
(74) *Attorney, Agent, or Firm* — Nicholas Pfeifer; Ronald E. Smith; Smith & Hopen, P.A.

(57) ABSTRACT

A method for replacing a leaking valve stem includes the steps of cutting a part of the valve stem external to a hollow interior of a tire at the external surface of a wheel/rim so that a base of the valve stem falls into the hollow interior of the tire and so that a wheel aperture is exposed. A replacement valve stem has a radially expandable base, a main body of frusto-conical shape, and an annular step is formed where the base meets the main body. Wrench-engageable flats are formed in a narrow end of the main body and an internally threaded boss is secured to the wrench-engageable flats. The radially expandable base is inserted into the wheel aperture and the annular step abuts an exterior surface of the wheel/rim. The expandable base is then expanded until the wheel/rim is tightly sandwiched between the expanded base and the annular step.

4 Claims, 10 Drawing Sheets

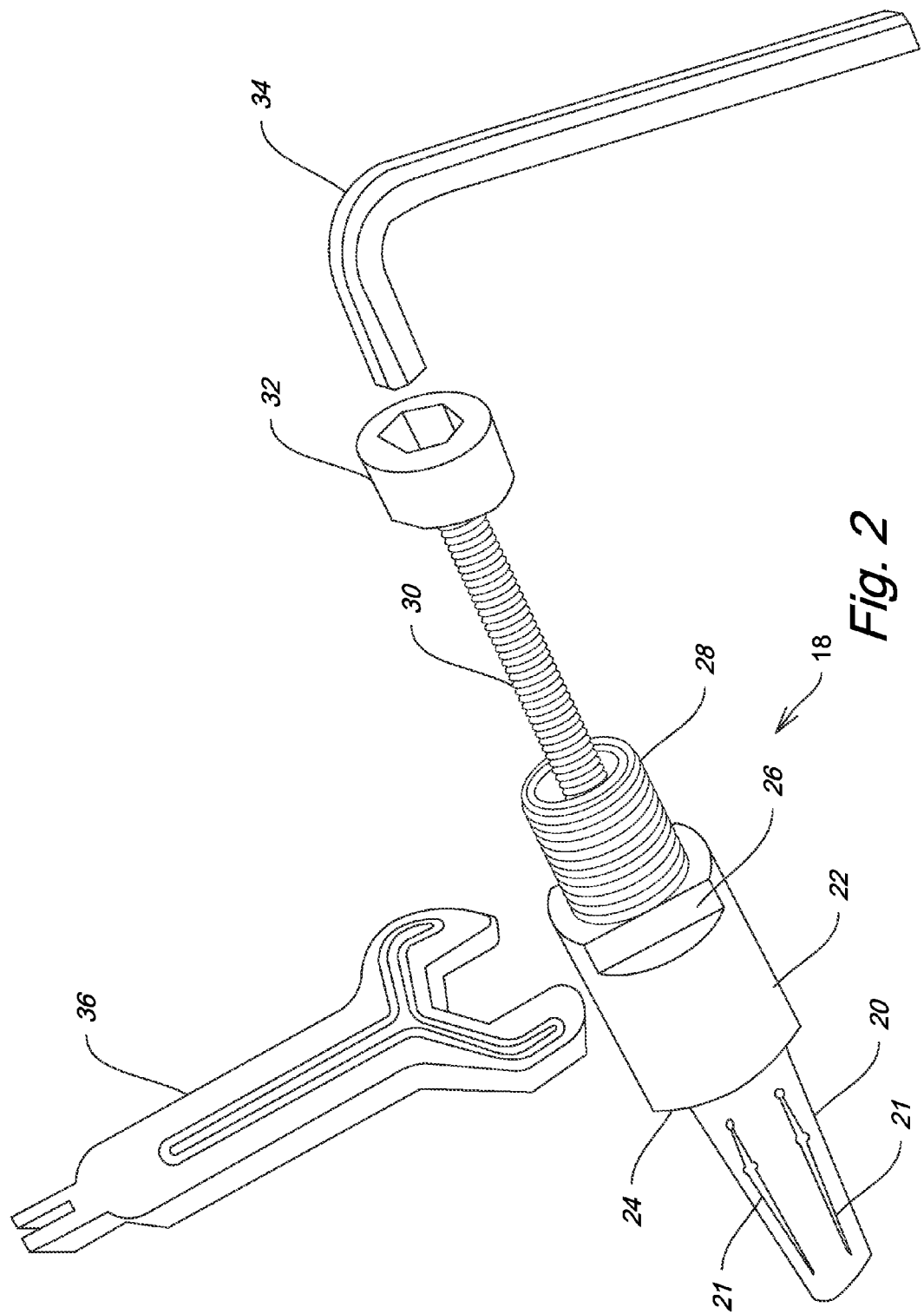

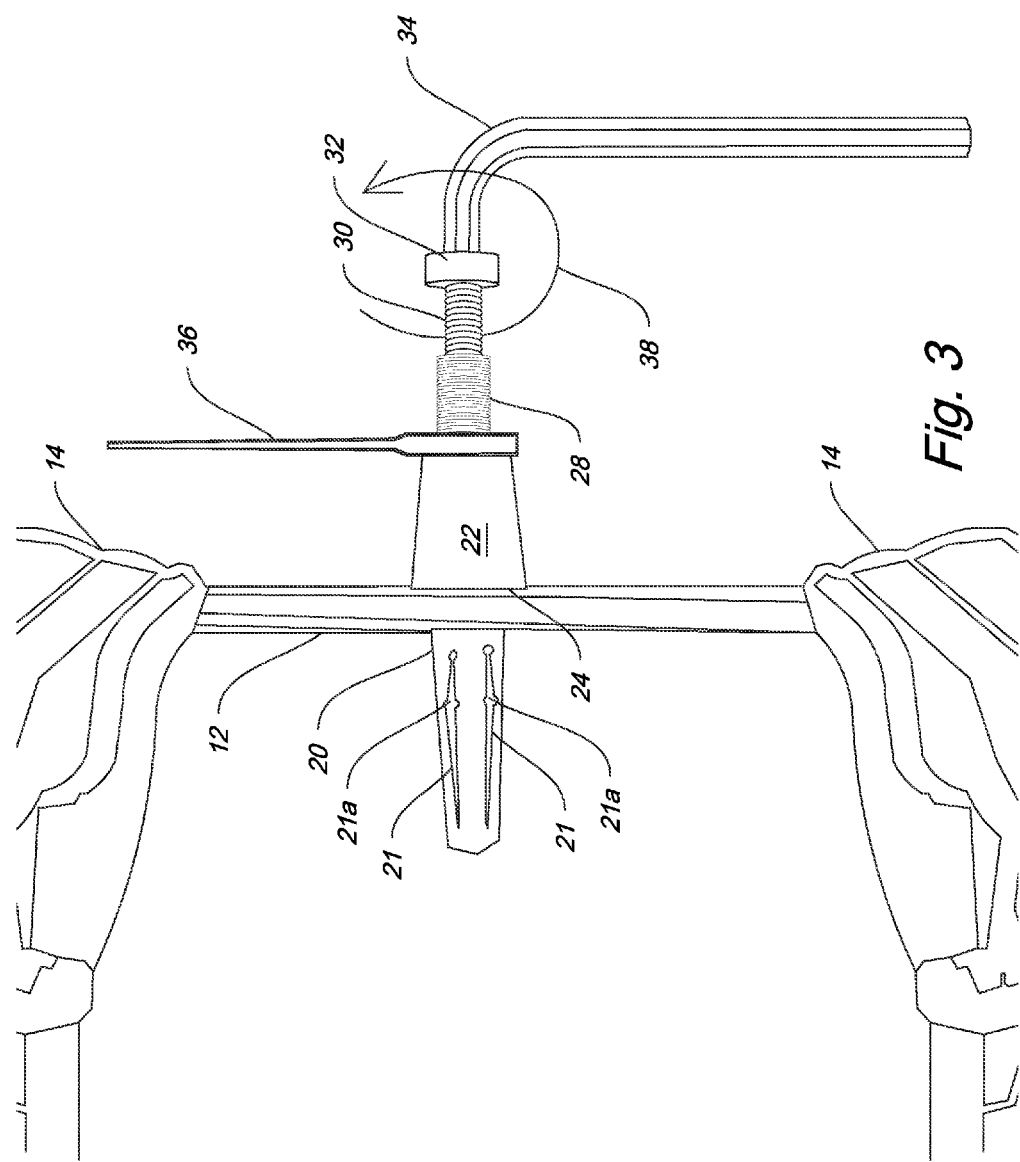

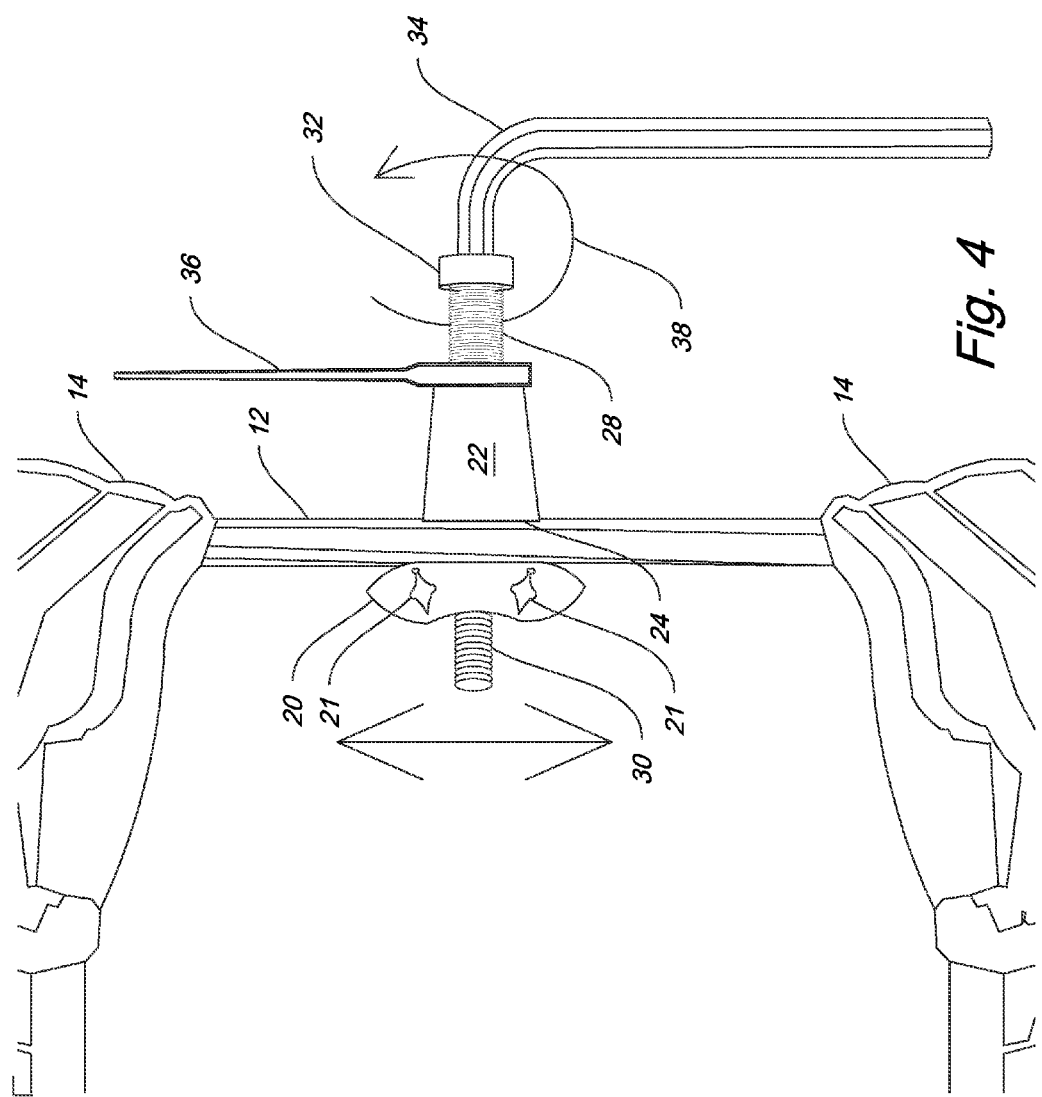

METHOD AND APPARATUS FOR REPLACING A TIRE VALVE STEM WITHOUT HAVING TO RAISE THE VEHICLE, REMOVE THE WHEEL, OR TIRE FROM THE WHEEL

BACKGROUND OF THE INVENTION

1. Field of the Invention

This invention relates, generally, to a method for replacing tire valve stems that leak. It also relates to tools used to perform the steps of the method.

2. Description of the Prior Art

Valves stems provide fluid communication between the inside of a tire and the external environment so that gaseous fluid can be added to the tire as needed. Each valve stem includes a check valve having a position of repose that prevents gaseous fluid under pressure inside the tire from flowing out. The check valve is displaced from its position of repose when a conventional pump is used to inflate the tire.

Accordingly, if the valve stem leaks, the check valve is bypassed and the tire deflates. Replacing a valve stem by conventional methods is a time-consuming process because it requires jacking up the vehicle, removing the deflated tire, followed by separation of the rubber tire form the metallic wheel so that the worn out valve stem can be replaced by a new one. The tire must then be re-mounted. As recited in an article posted on the Internet at eHow.com, the steps required to replace a valve stem include: 1) Unscrew, and remove, the valve stem cap; 2) Insert the valve stem core pulling tool into the valve stem, and twist it to the left, until the core unthreads and the air pressure in the stem is released; 3) Lay the tire flat on the floor, and break the seal where the sidewall of the tire meets the rim, by stepping on the sidewall with your foot or pounding on it with a sledge hammer, 4) Find where the valve stem is on the rim, and push in the sidewall of the tire to expose the inner gasket of the stem with your foot; 5) Apply a generous amount of tire-changing lubricant over the outer and inner rubber gaskets of the valve stem with a toothbrush; 6) Grip the outer valve stem with a pair of pliers, and twist it back and forth to allow the lubricant to saturate the valve gaskets; 7) Insert a screwdriver through the valve stem, until the handle is flush with the lip of the threaded part of the stem; 8) Hold the handle of the screwdriver with your left hand, and tap, or pound, the head of the handle with the sledge hammer, until the valve stem is pushed all the way through the rim. The instructions end at that point but, obviously, the awkward separation between the rubber tire and metal rim must be maintained as the new valve stem is introduced into its opening from inside the rubber tire.

Thus, there is a need for a less time-consuming and less difficult, more cost-effective, convenient method of replacing a defective valve stem. Three simple tools that facilitate execution of the method steps are included.

SUMMARY OF THE INVENTION

The long-standing but heretofore unfulfilled need for a method and apparatus that facilitates valve stem replacement is now met by a new, useful, and non-obvious invention.

The novel method for replacing a leaking valve stem does not require raising the vehicle, or removing the wheel or tire from the vehicle.

The replacement valve stem is also novel. It may be formed of a metallic material such as brass or other suitable material such as a high impact plastic. In a first embodiment, it includes a radially expandable base having a non-expanded configuration and an expanded configuration, an annular step formed where the radially expandable base meets the wide end of a frusto-conical main body, said frusto-conical main body having wrench-engageable flats formed in the narrow end thereof, and a boss having external threads formed thereon. The radially expandable base, the frusto-conical main body, and the boss share a common lumen and a common longitudinal axis of symmetry.

In the first embodiment, the boss is formed integrally with the wrench-engageable flats formed in the frusto-conical main body and houses a conventional Schrader valve and core. A conventional protective dust cap, salvaged from the faulty valve stem, engages the external threads of the boss when the installation of the novel valve stem is completed.

The novel valve stem replacement method includes the following steps when the first embodiment is used:

1) Bending over the faulty valve stem and cutting it off flush with the wheel/rim, allowing the interior section of the stem to fall into the interior of the wheel. A wheel aperture is now exposed and ready for the new valve stem.

2) Inserting the expandable base in its unexpanded configuration through the wheel aperture until the annular step of the frusto-conical main body abuts the exterior surface of the wheel/rim. The radially expandable base is now positioned in the hollow interior of the tire.

3) Holding the valve stem against rotation with a suitable tool such as a ¼-inch open-end wrench and expanding the radially expandable base by advancing an elongate externally threaded screw such as a jackscrew. The jackscrew draws back the leading end of the radially expandable base in a well-known way until said radially expandable base is in its expanded configuration and is drawn up against the interior of the wheel, sandwiching the wheel tightly between the radially-expandable base in said expanded configuration and said annular step.

4) Removing the elongate, externally threaded screw.

5) Inserting a conventional valve core into the boss.

6) Adding air to the tire in the well-known conventional way, i.e., by engaging a pump to the boss.

7) Engaging a conventional internally-threaded dust cap to the external threads of the boss when the tire is inflated.

In the second embodiment of the invention, the main body is cylindrical instead of frusto-conical so that no annular step is provided between the main body and the radially expandable base, but the second embodiment is installed in the same way as the first embodiment.

The primary object of the invention is to provide a simple method that enables a leaking tire valve stem to be replaced without removing the wheel or requiring separation of a rubber tire from the rim of a metal wheel.

Another important object is to provide a replacement valve stem that is used when the steps of the novel method are performed.

These and other important objects, advantages, and features of the invention will become clear as this disclosure proceeds.

The invention accordingly comprises the features of construction, combination of elements, and arrangement of parts that will be exemplified in the disclosure set forth hereinafter and the scope of the invention will be indicated in the claims.

BRIEF DESCRIPTION OF THE DRAWINGS

For a fuller understanding of the nature and objects of the invention, reference should be made to the following detailed disclosure, taken in connection with the accompanying drawings, in which:

FIG. 2 is an exploded perspective view depicting a first embodiment of the novel replacement valve stem and the tools required to install it;

FIG. 3 is a diagrammatic sectional view depicting the parts depicted in FIG. 2 at the beginning of the installation of the replacement valve stem;

FIG. 4 is a diagrammatic sectional view depicting the expansion of the base of the replacement valve stem in response to advancement of a screw;

DETAILED DESCRIPTION OF THE PREFERRED EMBODIMENT

Figure 1A:
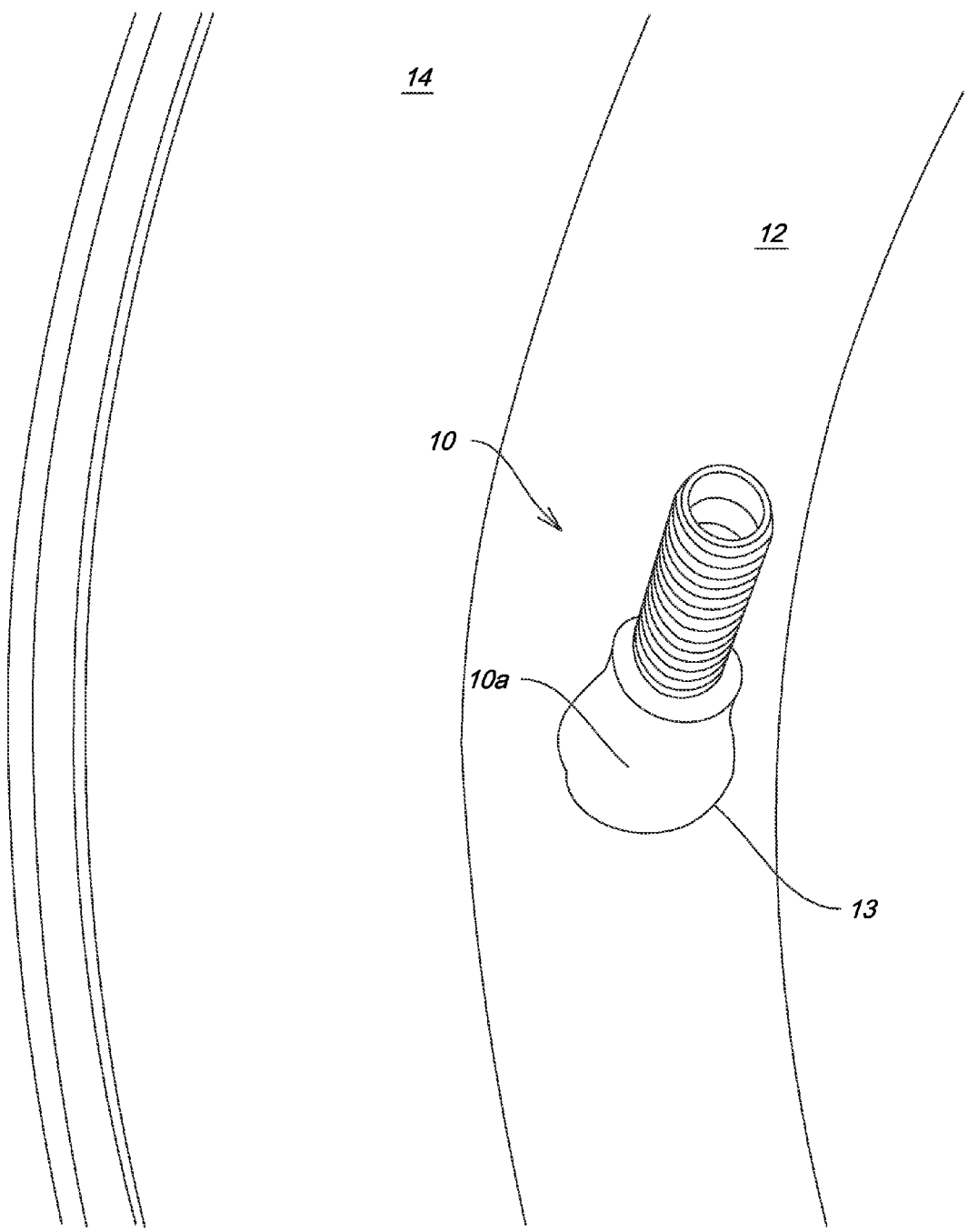
FIG. 1A is a perspective view of an inoperative valve stem in its operational position.

FIG. 1A depicts a conventional valve stem 10 mounted in wheel/rim 12 of a rubber tire 14. Valve stem 10 has a base, not depicted in FIG. 1A, that is positioned in the hollow interior of the tire. In some tires, the base may be positioned in the hollow interior of an inner tube. Main body 10a of valve stem 10 extends through wheel aperture 13 formed in wheel/rim 12 and is thus positioned externally of tire 14.

Figure 1B:
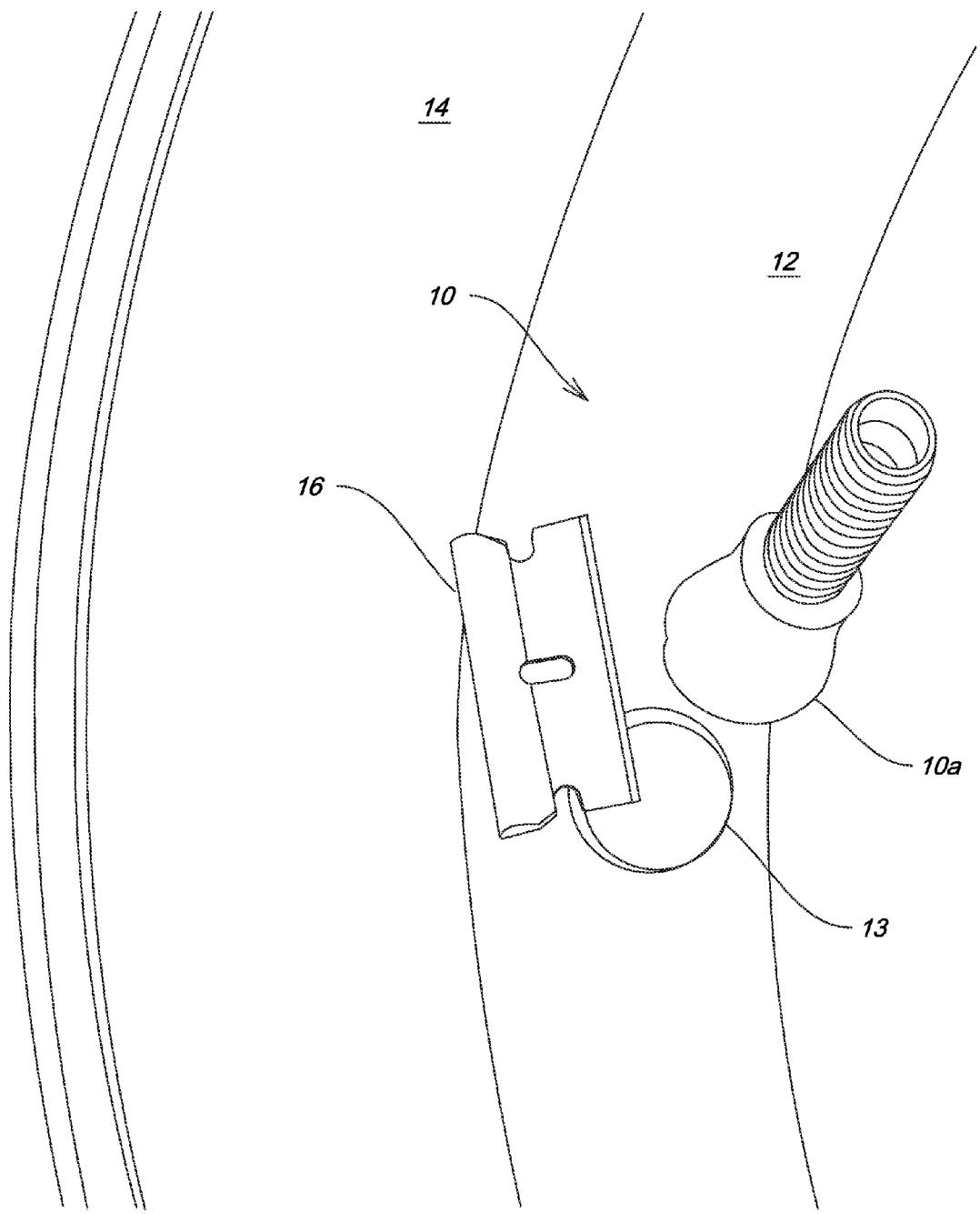
FIG. 1B is a perspective view depicting the cutting of the valve stem flush with the surface of the valve stem opening formed in the wheel.

FIG. 1B depicts the first step of the novel method. Upon determining that valve stem 10 is leaking, external main body 10a of valve stem 10 is cut off, preferably flush with wheel/rim 12, by razor 16 or other suitable cutting tool, thereby exposing wheel aperture 13.

Figure 1C:
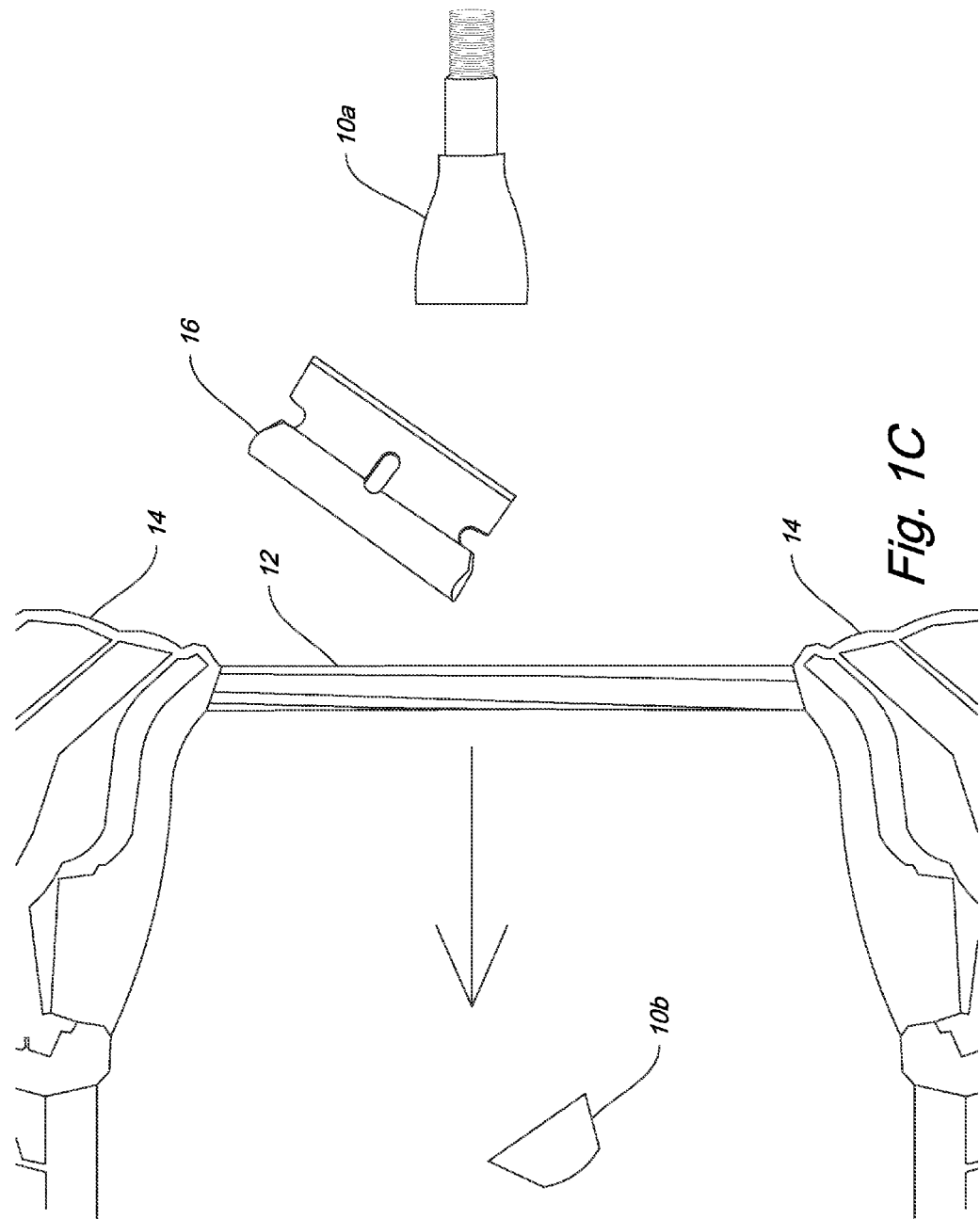
FIG. 1C is a perspective view depicting the valve stem base falling into the hollow interior of the tire.

As depicted in FIG. 1C, the cutting of valve stem 10 causes valve stem base 10b to fall under the influence of gravity into the hollow interior of tire 12. External main body 10a is discarded or recycled. The protective dust cap of external main body 10a is retained so that it can be used again when the novel replacement valve stem has been installed.

FIG. 2 is an exploded perspective view depicting novel plastic or brass valve stem 18 which replaces conventional valve stem 10. Novel valve stem 18 includes radially expandable base 20 and main body 22 having a frusto-conical shape. An annular step 24 is formed where radially expandable base 20 and the wide end of frusto-conical main body 22 meet. Wrench-engageable flats 26 are formed in the narrow end of frusto-conical main body 22 and said flats are formed integrally with externally threaded boss 28. An internally threaded conventional protective dust cap, preserved when the leaking valve stem was cut off, engages the external threads formed in boss 28 when the replacement job has been completed.

Elongate jackscrew 30 is externally threaded and engages internal threads formed in radially expandable base 20 when said jackscrew is advanced, said advancement drawing back the leading end of the radially expandable base until said radially expandable base is in its expanded configuration.

Jackscrew 30 has tool-engageable head 32 which has a non-round recess formed therein to accommodate the head-engaging end of Allen wrench or hex key 34. Conventional ¼-inch open-end wrench 36 is used as disclosed hereinafter to engage wrench-engageable flats 26 to prevent rotation of radially expandable base 20, main body 22, said wrench-engageable flats and boss 28 during installation of novel valve stem 18. As in a conventional valve stem, a bore/air passageway or lumen is formed in radially expandable base 20, main body 22, wrench-engageable flats 26 and boss 28, said passageway being coincident with the longitudinal axis of symmetry of replacement valve stem 18, said axis of symmetry not being indicated to avoid cluttering of the drawings.

FIG. 3 is a diagrammatic view depicting the placement of the parts disclosed in FIG. 2 at the beginning of the installation of replacement valve stem 18. Radially expandable base 20 in its unexpanded configuration is positioned in the hollow interior of tire 14 and annular step 24 abuts an external surface of rim/wheel 12. Conventional wrench 36 engages wrench-engageable flats 26 and is held by a user, not depicted, to prevent rotation of said wrench-engageable flats and hence of radially expandable base 20, main body 22 and boss 28. Hex key 34 engages tool engageable head 32 of jackscrew 30. Directional arrow 38 indicates that jackscrew 30 is advanced by clockwise rotation of hex key 34.

It is well-known from the art of hollow wall anchors how the leading end of an advancing jackscrew can displace slotted, jointed members radially outwardly to effect expansion of a radially expandable base disposed in a hollow space covered by drywall to prevent reverse travel of the radially expandable base through an aperture through which the base was inserted. Such well-known or similar structure is used as a part of this invention and is depicted in FIG. 3 where the slots are denoted 21 and the joints are denoted 21a. Wheel/rim 12 is the equivalent of a hollow wall.

FIG. 4 is a diagrammatic view indicating the expansion of radially expandable base 20 in response to the advancement of jackscrew 30. Directional arrow 38 indicates continued clockwise rotation of hex key 34 to ensure that the jointed members expand radially outwardly in the well-known way to form a tight sandwiching of wheel/rim 12 between radially expandable base 20 in its expanded configuration and annular step 24.

Figure 5:
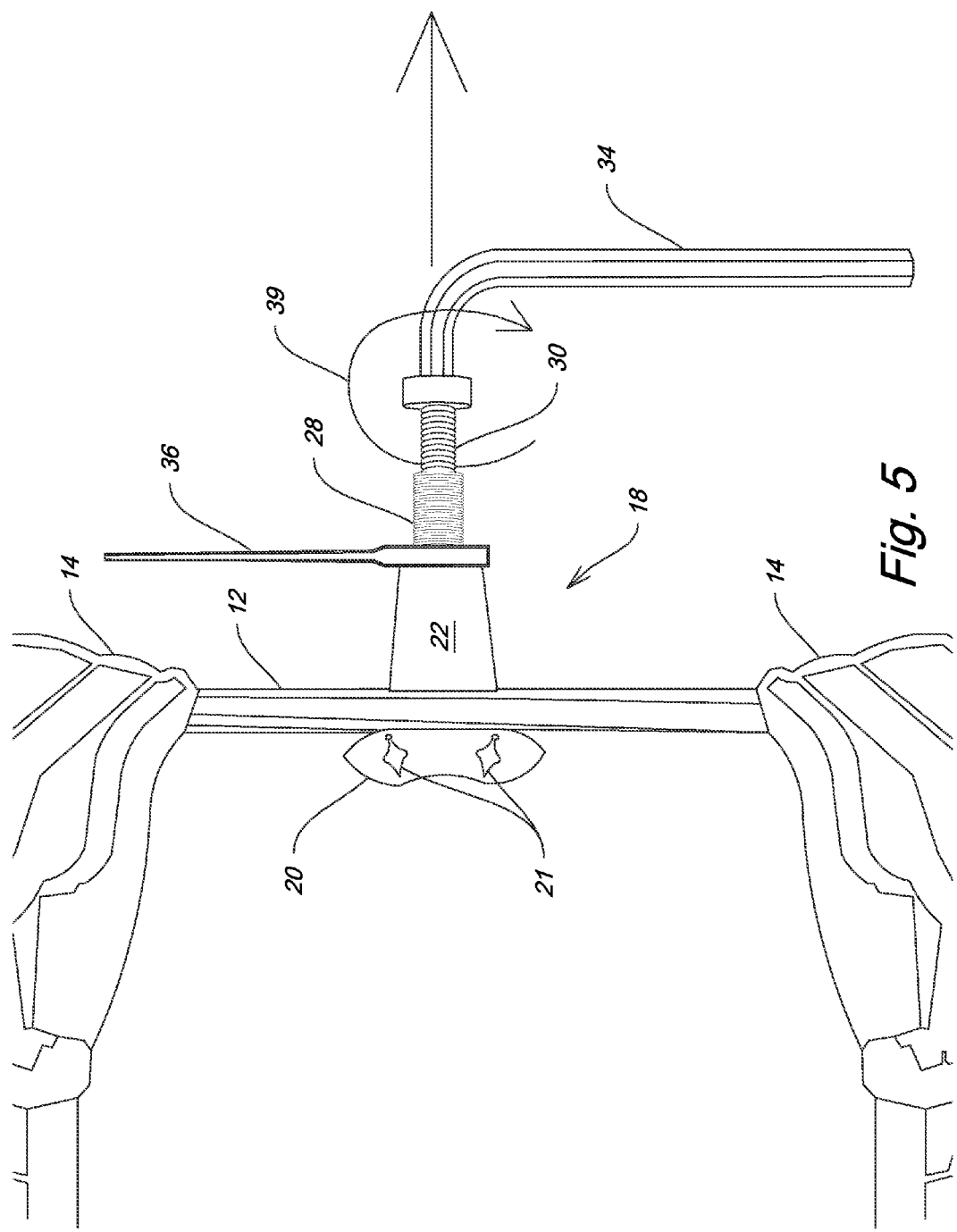
FIG. 5 is a diagrammatic sectional view depicting withdrawal of the screw when the radially expandable base is in its expanded configuration.

FIG. 5 is a diagrammatic view depicting withdrawal of jackscrew 30 after full expansion of radially expandable base 20 has been accomplished. Conventional wrench 36 continues to engage wrench-engageable flats 26 to hold the novel assembly against rotation as jackscrew 30 is rotated counter-clockwise by hex key 34 to effect said withdrawal.

Figure 6:
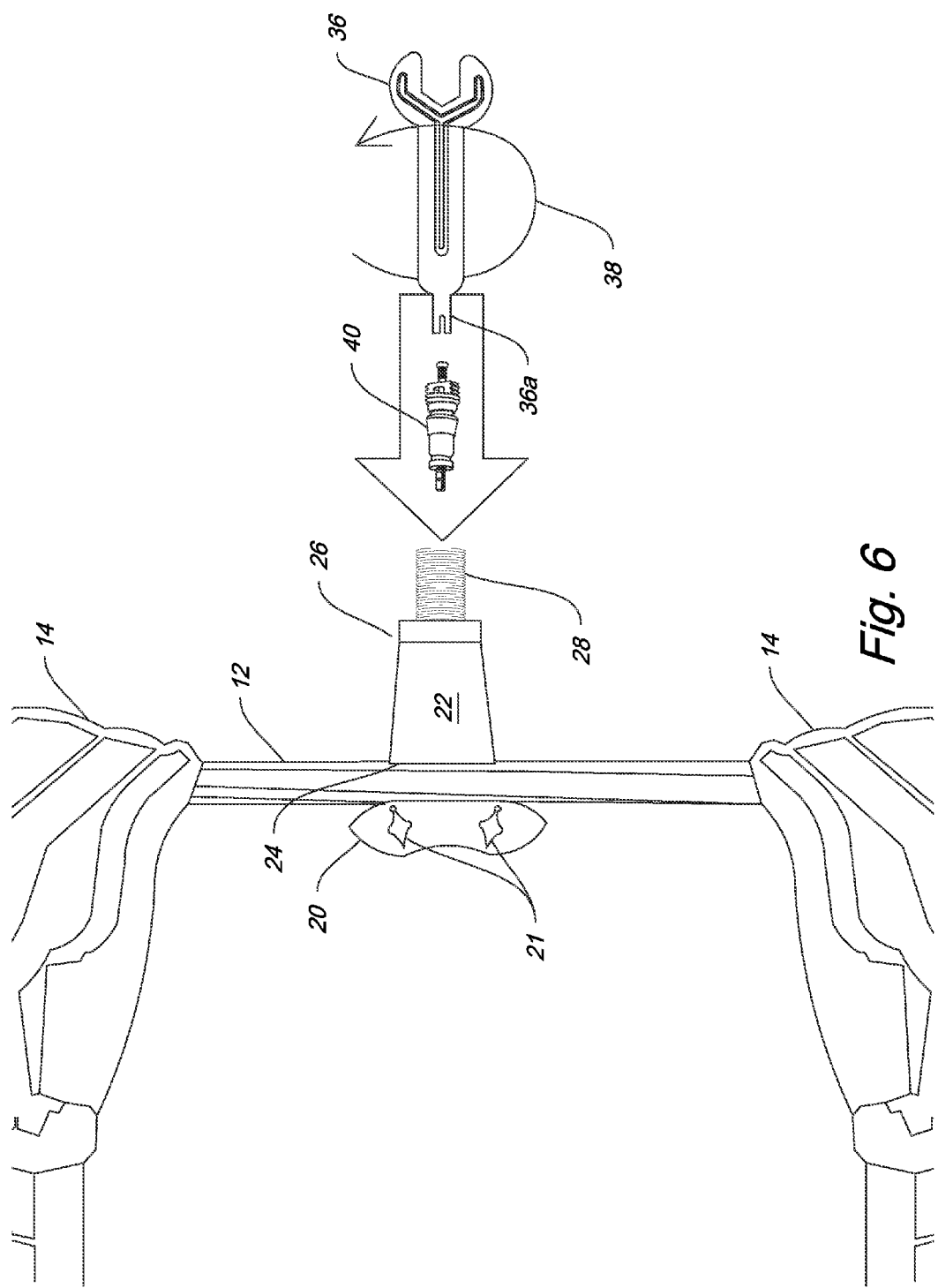
FIG. 6 is a diagrammatic sectional view depicting insertion of the new check valve.

FIG. 6 is a diagrammatic view depicting insertion of conventional check valve 40 into boss 28 after jackscrew 30 has been removed. In this particular example, conventional wrench 36 is modified to include a flat head 36a, much like the head of a flat head screwdriver, to engage a slot formed in the head of check valve 40. Rotation of wrench 36 in the clockwise direction as indicated by directional arrow 38 secures externally threaded check valve 40 into internally threaded boss 28. Due to the tight sandwiching engagement of wheel/rim 12 by base 20 and annular step 24, conventional wrench 36 need not engage wrench-engageable flats 26 to prevent rotation of valve stem 18 during this step.

Although not depicted, conventional hex key 34 could also be modified to include flat head 36a for the same purpose.

Figure 7:
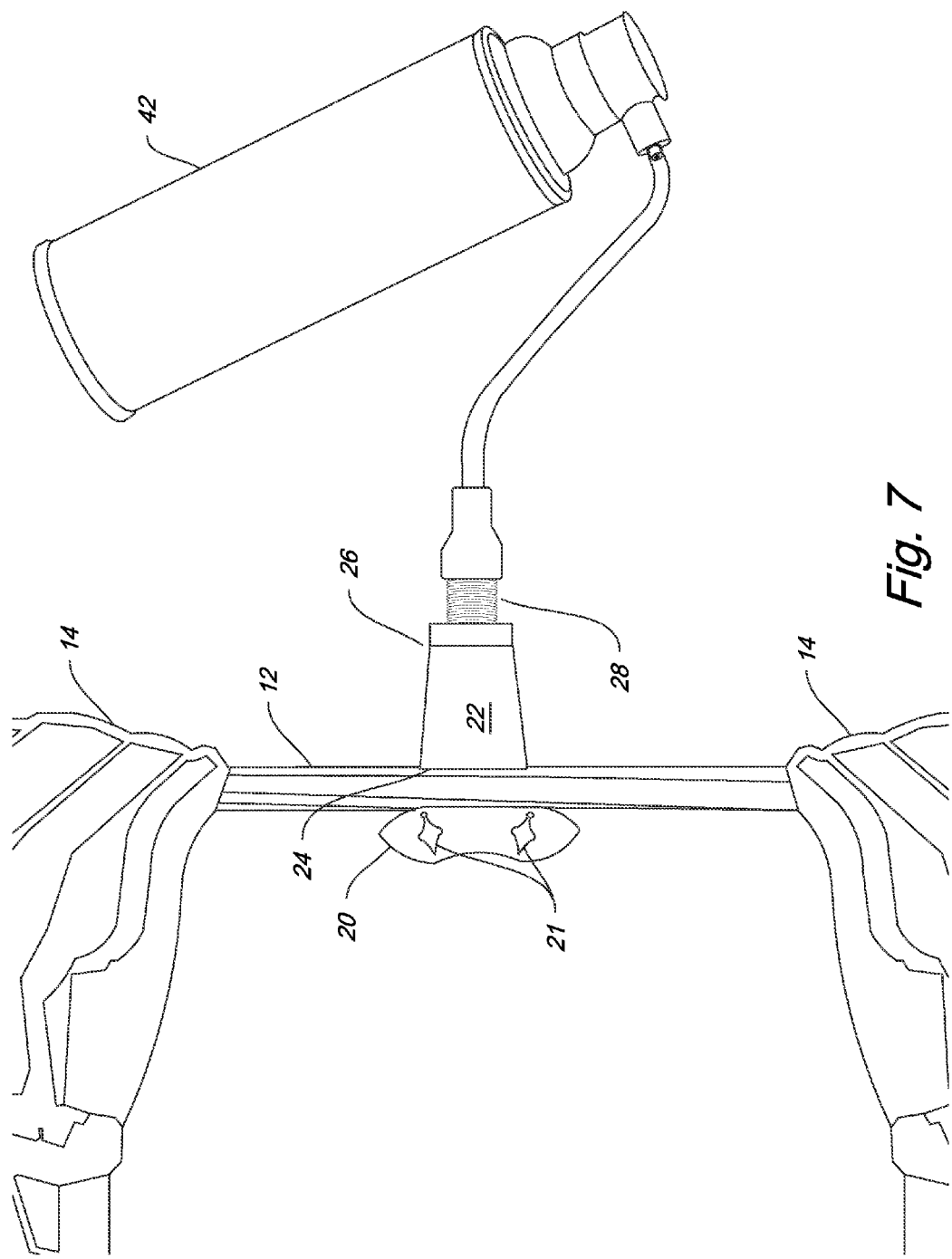
FIG. 7 is a diagrammatic sectional view depicting the inflation of the tire through the newly installed valve stem.

FIG. 7 is a diagrammatic view depicting the inflation of the tire through newly installed valve stem 18 by means of conventional pump 42. When pump 42 is disconnected from boss 28, a conventional protective dust cap, not depicted, is screwed onto the external threads of said boss, as is very well-known.

Figure 8:
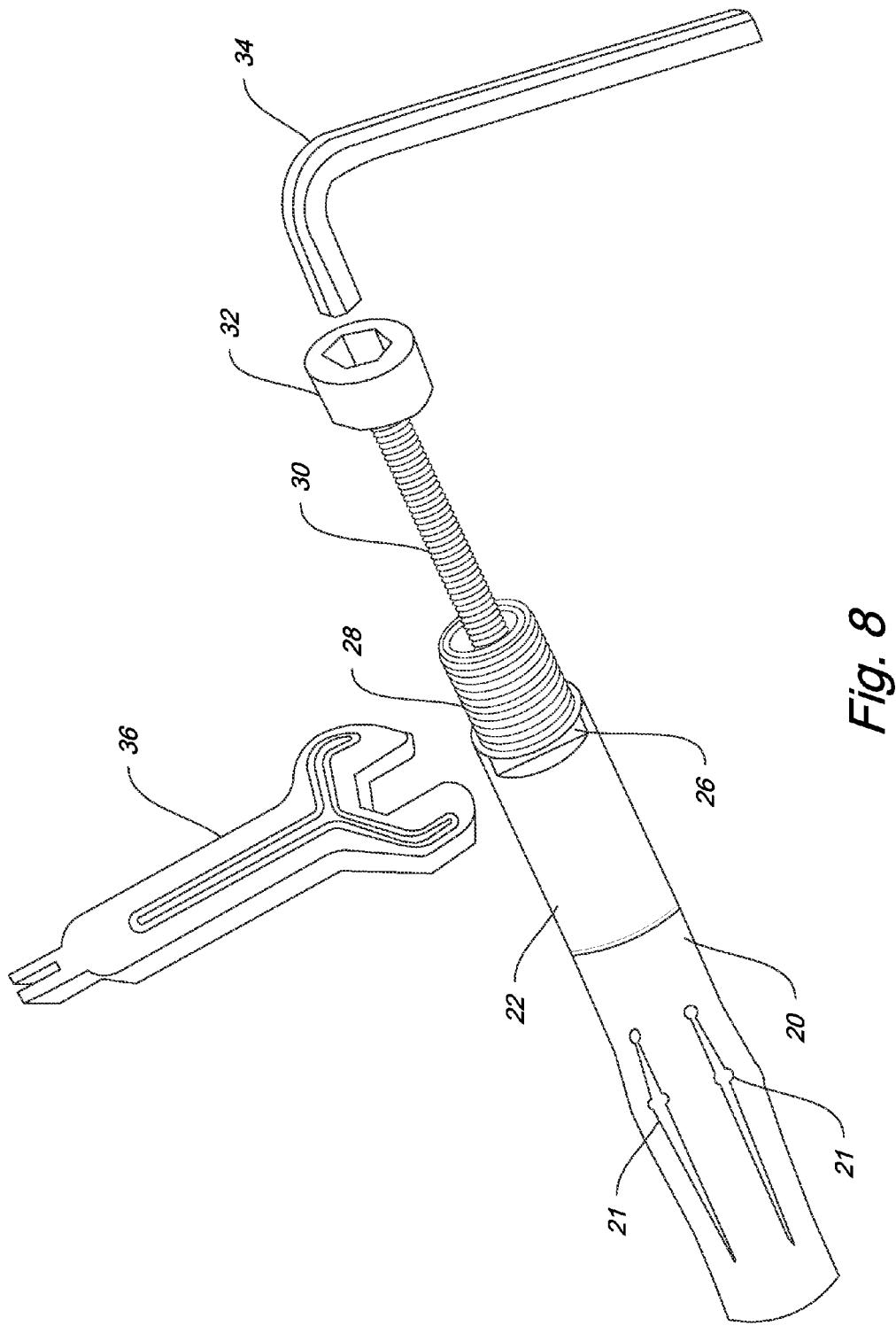
FIG. 8 is a perspective view of a second embodiment of the invention.

FIG. 8 is a perspective view of a second embodiment where main body 22 is cylindrical in configuration and thus no annular step 24 is provided. Wrench-engageable flats 26 are formed in said cylindrical main body 22 for the same reason as in the first embodiment.

The embodiment of FIG. 8 is used in much the same way as the first embodiment. After cutting a part of the leaking valve stem that is external to a hollow interior of the tire at or near the external surface of a wheel/rim so that a base of the leaking valve stem falls under the influence of gravity into the hollow interior of the tire and so that a wheel aperture formed in said wheel/rim is exposed, a non-leaking valve stem having a radially expandable base and a main body of cylindrical shape is provided. The radially expandable base has an unexpanded configuration and an expanded configuration just as in the first embodiment. Wrench-engageable flats are formed in the cylindrical main body. As in the first embodiment, an externally threaded boss is formed integrally with the wrench-engageable flats so that the radially expandable base, the cylindrical main body, the wrench-engageable flats and the boss share a common longitudinal axis of symmetry. The expandable base in its unexpanded configuration is inserted into the wheel aperture so that the expandable base in its unexpanded configuration is positioned in the hollow interior of the tire. The radially expandable base is then expanded in the same way as the first embodiment, i.e., using jackscrew 30, until the wheel/rim is tightly sandwiched between the expanded base and the cylindrical main body.

In both embodiments, radially expandable base 20 and main body 22 are preferably covered with a vulcanized rubber, not depicted, to simplify the drawings. Either embodiment may be formed of a metallic material such as brass or other suitable material such as a high impact plastic.

Any user can use the novel method and tools on the side of the road by bending over the leaking valve stem and cutting it off so that the base falls into the hollow interior of the tire. Novel replacement valve stem 18 is then pushed into the opening (wheel aperture 13) thus created. Applying a friction-reducing substance such as water to replacement valve stem 18 facilitates the insertion. About six (6) turns of jackscrew 30 by hex key 34 is sufficient to radially expand radially expandable base 20. After removing the jackscrew, and installing the new core/check valve 40, another four (4) or five (5) turns of the check valve is required. The finished installation is then "aired up" with compressed air or FIX A FLAT® sealant or SLIME® sealant which takes only a few seconds. The entire procedure can be completed in a few minutes with nominal physical exertion.

It will thus be seen that the objects set forth above, and those made apparent from the foregoing disclosure, are efficiently attained and since certain changes may be made in the above construction without departing from the scope of the invention, it is intended that all matters contained in the foregoing disclosure or shown in the accompanying drawings shall be interpreted as illustrative and not in a limiting sense.

It is also to be understood that the following claims are intended to cover all of the generic and specific features of the invention herein disclosed, and all statements of the scope of the invention that, as a matter of language, might be said to fall there between.

What is claimed is:

1. A method for replacing a leaking valve stem that does not require having to raise the vehicle, remove the wheel, or tire from the wheel or separation of a rubber tire from a metallic wheel, comprising the steps of:

cutting a part of said leaking valve stem that is external to a hollow interior of said tire at or near the external surface of a wheel/rim so that a base of said leaking valve stem falls under the influence of gravity into the hollow interior of the tire and so that a wheel aperture formed in said wheel/rim is exposed;

providing a non-leaking valve stem having a radially expandable base and a main body of frusto-conical shape;

said radially expandable base having an unexpanded configuration and an expanded configuration;

said radially expandable base forming an annular step with said frusto-conical main body when said expandable base is in said unexpanded condition;

forming wrench-engageable flats in a narrow end of said frusto-conical main body;

forming an externally threaded boss integrally with said wrench-engageable flats so that said radially expandable base, said frusto-conical main body, said wrench-engageable flats and said boss share a common lumen having a common longitudinal axis of symmetry;

inserting said expandable base in its unexpanded configuration into said wheel aperture so that said expandable base in its unexpanded configuration is positioned in the hollow interior of said tire and so that said annular step abuts an exterior surface of said wheel/rim;

expanding said radially expandable base until said wheel/rim is tightly sandwiched between said radially expandable base in its expanded configuration and said annular step.

2. The method of claim 1, further comprising the steps of:

expanding said radially expandable base by advancing an elongate externally threaded screw through said common lumen of said externally threaded boss and said frusto-conical main body so that a leading end of said elongate externally threaded screw engages said radially expandable base, causing said radially expandable base to expand in multiple radially outwardly directions so that said radially expandable base when in said expanded configuration cannot pass through said wheel aperture.

3. An apparatus for replacing a malfunctioning valve stem in a tire, comprising:

a valve stem having a radially expandable base;

said radially expandable base having an unexpanded configuration where said radially expandable base is adapted to extend through a wheel aperture formed in a wheel/rim;

a frusto-conical main body having a wide end and a narrow end, said wide end abutting said radially expandable base;

an annular step formed where said radially expandable base abuts said frusto-conical main body;

a plurality of wrench-engageable flats formed in said narrow end of said main body;

a boss formed integrally with said plurality of wrench-engageable flats so that said radially expandable base, said frusto-conical main body, said wrench-engageable flats and said boss share a common lumen and a common longitudinal axis of symmetry;

an elongate externally threaded screw having a leading end that engages said radially expandable base and causes radially outward expansion of said radially expandable base as said externally threaded elongate screw is advanced;

said wheel/rim being sandwiched between said radially expandable base and said annular step when said radially expandable base is in said expanded configuration.

4. A method for replacing a leaking valve stem that does not require separation of a rubber tire from a metallic wheel, comprising the steps of:

- cutting a part of said leaking valve stem that is external to a hollow interior of said tire at or near the external surface of a wheel/rim so that a base of said leaking valve stem falls under the influence of gravity into the hollow interior of the tire;
- said cutting exposing a wheel aperture formed in said wheel/rim;
- providing a non-leaking valve stem having a radially expandable base and a main body of cylindrical shape;
- said radially expandable base having an unexpanded configuration and an expanded configuration;
- forming wrench-engageable flats in said cylindrical main body;
- forming an externally threaded boss integrally with said wrench-engageable flats so that said radially expandable base, said cylindrical main body, said wrench-engageable flats and said boss share a common lumen and a common longitudinal axis of symmetry;
- inserting said expandable base in its unexpanded configuration into said wheel aperture so that said expandable base in its unexpanded configuration is positioned in the hollow interior of said tire;
- expanding said radially expandable base until said wheel/rim is tightly sandwiched between said radially expandable base in its expanded configuration and said cylindrical main body.

* * * * *